US007120164B2

(12) United States Patent
Le

(10) Patent No.: US 7,120,164 B2
(45) Date of Patent: *Oct. 10, 2006

(54) APPARATUS AND ASSOCIATED METHOD FOR COMMUNICATING MULTIMEDIA INFORMATION UPON A COMMUNICATION LINK

(75) Inventor: Khiem Le, Coppell, TX (US)

(73) Assignee: Nokia Corporation, Espoo (FI)

( * ) Notice: Subject to any disclaimer, the term of this patent is extended or adjusted under 35 U.S.C. 154(b) by 653 days.

This patent is subject to a terminal disclaimer.

(21) Appl. No.: 10/029,684

(22) Filed: Dec. 20, 2001

(65) Prior Publication Data

US 2002/0089998 A1 Jul. 11, 2002

Related U.S. Application Data

(63) Continuation of application No. 09/283,808, filed on Apr. 1, 1999, now Pat. No. 6,466,585.

(51) Int. Cl.
*H04J 3/16* (2006.01)

(52) U.S. Cl. .................................... 370/465

(58) Field of Classification Search ............... 370/405, 370/401, 465, 466, 467, 474, 470, 390, 476, 370/257, 351, 352, 201, 259, 337, 320, 311, 370/400, 389, 503, 342, 347, 441, 442; 379/93.07, 379/93.05, 96.06, 93.08
See application file for complete search history.

(56) References Cited

U.S. PATENT DOCUMENTS

| 5,351,016 | A | 9/1994 | Dent ........................... 332/103 |
| 5,563,649 | A | 10/1996 | Gould et al. ................... 348/17 |
| 5,617,539 | A | 4/1997 | Ludwig et al. ........ 395/200.02 |
| 5,748,678 | A | 5/1998 | Valentine et al. ............ 375/297 |
| 5,790,173 | A | 8/1998 | Strauss et al. .................. 348/7 |
| 5,841,764 | A * | 11/1998 | Roderique et al. .......... 370/310 |
| 6,130,880 | A | 10/2000 | Naudus et al. .............. 370/235 |
| 6,546,405 | B1 * | 4/2003 | Gupta et al. ................. 715/512 |
| 6,594,276 | B1 * | 7/2003 | Le .............................. 370/465 |

FOREIGN PATENT DOCUMENTS

| EP | 0821507 A2 | 1/1998 |
| EP | 0902571 A2 | 3/1999 |
| GB | 2301756 | 12/1996 |

* cited by examiner

*Primary Examiner*—Ajit Patel
(74) *Attorney, Agent, or Firm*—Foley & Lardner, LLP

(57) ABSTRACT

Apparatus, and associated method, converts real-time multimedia information generated pursuant to an RTP protocol into a form amenable for transmission upon a radio channel, such as a radio channel defined in a cellular communication system. When converted, the informational content of the multimedia information is transmitted in a manner that achieves spectral efficiency and low, constant delay. Once transmitted over the radio channel, the multimedia information is converted back into form corresponding to the RTP protocol before being sent to the receiving station.

11 Claims, 9 Drawing Sheets

APPARATUS AND ASSOCIATED METHOD FOR COMMUNICATING MULTIMEDIA INFORMATION UPON A COMMUNICATION LINK

The present application is a continuation of U.S. patent application Ser. No. 09/283,808, filed on Apr. 1, 1999 now U.S. Pat. No. 6,466,585.

The present invention relates generally to the communication of multimedia information, such as multimedia information formatted pursuant to the RealTime Transport Protocol (RTP). More particularly, the present invention relates to apparatus, and an associated method, for converting realtime multimedia information, formatted in packet data form, such as that formatted pursuant to the RTP, into a form to facilitate transmission of the information on a radio channel. Operation of an embodiment of the present invention permits the communication of multimedia information by way of a cellular, or other radio communication system, with minimal and constant time delay while also communicating the information in a spectrally-efficient manner.

BACKGROUND OF THE INVENTION

Advancements in communication technologies have permitted the introduction of, and popularization of, new types of, and improvements in existing, communication systems. Increasingly large amounts of data are permitted to be communicated at increasing thruput rates through the use of such new, or improved, communication systems. As a result of such improvements, new types of communications, requiring high data thruput rates, are possible. Digital communication techniques, for instance, are increasingly utilized in communication systems to efficiently communicate digital data, and the use of such techniques has facilitated the increased data thruput rates.

Multimedia communications, for instance, are exemplary of new types of communications permitted as a result of the improvements in communications technologies. Multimedia communications refer, generally, to the communication of more than one type of data between a sending station and a receiving station. Typically, the communication of such more than one type of data appears, to a user, to be simultaneous. Multimedia communications include, for instance, voice-over-data applications. Audio signals overlaid upon video signals used to effectuate teleconferencing is an example of a multimedia communication application. Two-way white board communication is exemplary of another multimedia communication application.

The different types of data exhibit different communication requirements. For instance, voice data must be communicated in real-time. That is to say, voice data must be communicated without significant delay and must be communicated in a manner which permits its reconstruction at a receiving station in a manner which introduces minimal time distortion. Otherwise, the voice data shall appear to be noticeably distorted. Conversely, non-voice data is not as time-sensitive. However, more stringent accuracy requirements are associated with non-voice data.

Multimedia communications can be effectuated utilizing packet data communication techniques. With the popularization of the Internet and communication thereon, standardized, multimedia protocols have been set forth by which to communicate multimedia information in a form amenable to its transmission by way of the Internet. An example of multimedia protocol is H.323. H.323 is a widely used ITU standard which uses RTP.

According to the H.323 protocol, when multimedia data is to be transmitted by a sending station, logical channels upon which to transmit the data are assigned. The data channels are allocated responsive to requests made by the sending station. Separate logical channels are requested for separate types of data. For instance, a first logical channel is requested upon which to transmit voice data, and allocation of a second logical channel is requested for transmission of non-voice data. A subset of the H.323 protocol, referred to as the H.245 protocol, defines the manner in which the channels are requested. Packets of data are thereafter transmitted upon the logical channels. In conventional manner, the individual packets include header information, such as IP, UDP and RTP information, to identify to where the packet is to be directed and to provide a time stamp with the packet. The information of a packet of data, referred to as the payload, is appended to the header information.

The H.323 protocol was intended originally for wireline communications, such as between communication stations, connected by wireline connections including those of the Internet. But, advancements in communication technologies have also permitted the widespread usage of radio communication systems. A cellular communication system is exemplary of a wireless communication system which has achieved wide levels of popularity and usage. Telephonic communication by way of a cellular communication system mimics communication by way of a conventional wireline, telephonic system. However, because a radio-link is utilized in a cellular, or other radio, communication system, bandwidth considerations are generally more significant than when wireline networks are utilized for communications. That is to say, the radio-link upon which communication is communicated in a radio communication system is of a limited bandwidth capacity. And, by reducing the bandwidth requirements of information communicated thereon, the information capacity of the radio-link can be increased. So, efforts are made to minimize the bandwidth requirements of signals transmitted over the radio-link.

Information communicated pursuant to an H.323 protocol is predicated upon a packet-data configuration. The header information required of each packet of data is relatively bandwidth-consumptive. As a result, communication of multimedia information by way of a radio-link, such as that formed in the operation of a cellular communication system, is a relatively inefficient manner by which to communicate multimedia information. However, because the RTP-based protocol has become a de facto standard by which to format multimedia information, multimedia stations shall likely continue to be operable pursuant to such protocol irrespective of the bandwidth inefficiency of communication of packet data by way of the radio-link.

If a manner could be provided by which more efficiently to communicate multimedia information by way of a radio-link, while still utilizing the RTP-based protocol at the sending and receiving stations, improved multimedia communications by way of a radio communication system could result.

It is in light of this background information related to multimedia communications that the significant improvements of the present invention have evolved.

SUMMARY OF THE INVENTION

The present invention, accordingly, advantageously provides apparatus, and an associated method, for converting real-time multimedia information formatted in packet-data form, into a form to facilitate transmission of the information on a radio channel. Through such conversion, the multimedia information can be transmitted with minimal time delay while also being transmitted upon the radio channel in a spectrally efficient manner.

In one aspect of the present invention, real-time media, which is part of multimedia information, is communicated between sending and receiving multimedia stations. On the communications path between the sending and receiving stations there is a communications link, such as a radio link, that has bandwidth limitations and spectrum efficiency requirements. In what follows, that link shall, at times, be referred to as the communications link. The multimedia information, when generated at a sending multimedia station, and when provided to a receiving multimedia station, is formatted in packet-data form according to an existing RTP protocol. Before transmission on the communications link, real-time media is converted into a communications-link format. Once converted into the communications-link format, the real-time media can be transmitted upon a special channel on the communications-link in an efficient manner. Once received, the real-time media is converted out of the communications-link format and back into the packet-data format before being sent to the receiving station. The same process takes place in the reverse direction. A special channel is defined as a channel that provides a constant bit rate. In a CDMA (code-division, multiple-access) communication system, the channel can be realized by a unique code by which the information to be communicated is encoded. In a TDMA (time-division, multiple-access) communication system, the channel can be realized by a time slot-frequency combination. Other ways to realize a special channel are possible.

A typical example of communications link is a radio link.

Consider the example of a cellular multimedia station communicating with a wireline multimedia station. At the cellular station, the outgoing multimedia information is converted into a radio-link format. Once converted into the radio-link format, the multimedia information can be transmitted upon the radio-link in an efficient manner. Once received, the multimedia information is converted out of the radio-link format and back into the packet-data format before being sent to the wireline station. The reverse process takes place in the reverse direction.

In one implementation, the multimedia stations include multimedia terminals. The multimedia terminals are operable to generate, and to receive, multimedia information formatted pursuant to a multimedia protocol such as H.323. Multimedia information is communicated between the multimedia terminals by way of a radio communication system, such as a cellular communication system.

Operation of an embodiment of the present invention converts the packet data-formatted information into a form to permit its efficient transmission upon a channel defined in the cellular communication system. The multimedia protocol provides for two components, a control plane and a user plane. The control plane includes an application signaling protocol, such as H.245 for H.323. The application signaling protocol specifies logical channels to be opened for the communication of the different types of multimedia information. Operation of an embodiment of the present invention monitors the application signaling and detects the opening and closing of logical channels defined in the control plane. Messaging to open a real-time media channel is translated into messaging to set up a special channel upon which to communicate multimedia information between the multimedia stations. Monitoring continues, and when the application signaling indicates that the logical channels are to be closed, the corresponding special channel is also closed.

As the multimedia protocol such as H.323 is increasingly being used in Internet Protocol (IP)-based communication systems to effectuate multimedia communications, operation of an embodiment of the present invention advantageously permits multimedia devices, operable pursuant to the protocol, to operate without alteration. Apparatus of an embodiment of the present invention monitors signals generated by such existing multimedia devices, and utilizes such signals to convert the multimedia information into a form more amenable for transmission upon a circuit-switched, or other, radio channel. Overhead data, such as IP, RTP and UDP headers associated with each packet of data, is removed prior to transmission of the multimedia information upon the special channel. Subsequent to transmission upon the special channel, multimedia information is reconverted back into packet-data format, and the header information is affixed again to the packets of data. Because the header information, otherwise forming a portion of each packet of data, is removed prior to transmission of the payload data, the same information is not repeatedly transmitted on the special channel. Improved spectrum efficiency results.

In these and other aspects, therefore, apparatus, and an associated method, is provided for converting packet-formatted multimedia information into a radio-link format. Once converted into the radio-link format, the multimedia information is amenable for transmission upon a radio-link extending between a first communication station and a second communication station of a radio communication system. A detector is coupled to receive indications of the packet-formatted data. The detector detects control plane information associated with the packet-formatted data. A requester is coupled to receive indications of detection by the detector of the control plane information. The requester requests allocation of a special channel defined by the radio-link extending between the first and second communication stations, respectively, for communication of the multimedia information thereon. A format converter is coupled to receive the packet-formatted data of which the multimedia information is formed. Responsive to allocation of the special channel requested by the requester, the format converter converts the packet-formatted data into the radio-link format. Thereafter, transmission of the multimedia information, formatted in the radio-link format, is permitted upon the special channel.

A more complete appreciation of the present invention and the scope thereof can be obtained from the accompanying drawings which are briefly summarized below, the following detailed description of the presently-preferred embodiments of the invention and the appended claims.

DETAILED DESCRIPTION OF THE PREFERRED EMBODIMENT

Figure 1:
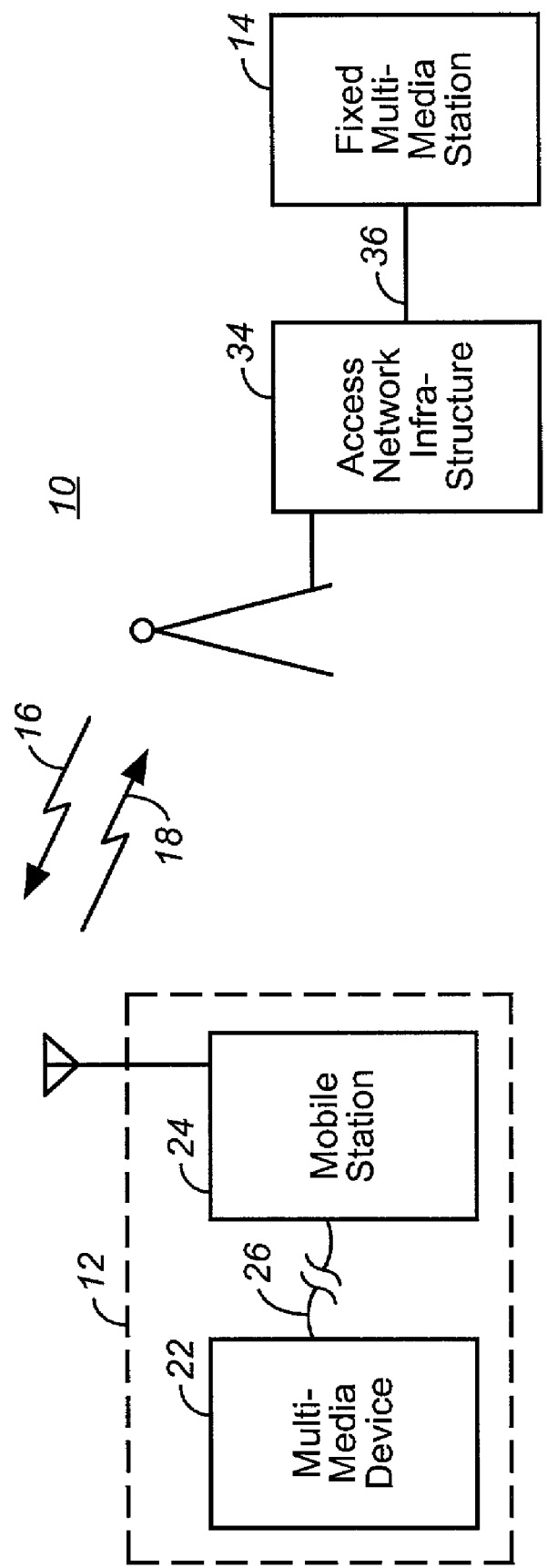
FIG. 1 illustrates a functional block diagram of a radio communication system operable pursuant to an embodiment of the present invention to communicate multimedia information.

Turning first to FIG. 1, a radio communication system, shown generally at 10, is operable to communicate multimedia information between multimedia stations. In the Figure, exemplary multimedia stations 12 and 14 are shown. In the exemplary implementation, the radio communication system 10 comprises a cellular communication system, such as a CDMA or TDMA communication system. In other implementations, the radio communication system is formed of other types of radio communication systems.

Multimedia information is communicated between the multimedia station 12 and the infrastructure by way of forward and reverse link channels, here represented by the arrows 16 and 18. In an implementation in which the radio communication system is formed of a CDMA cellular communication system, the forward and reverse link channels are defined by unique codes by which signals are encoded prior to their transmission. And, when the radio communication system comprises a TDMA, cellular communication system, the forward and reverse channels are defined by time slot-frequency combinations. In other implementations, the channels are defined in other manners.

The multimedia station 12 is here shown to include a multimedia device 22 and a mobile station 24. It should be understood, of course, that the embodiment shown in the figure is exemplary. In other implementations, the mobile multimedia station is constructed in other manners. The multimedia device 22 is operable to generate and receive real-time multimedia information pursuant to a packet data format such as the RTP protocol. In what follows, multimedia information generated by the multimedia device 22 will at times be referred to as mobile originated (MO), while multimedia information received by 22 will at times be referred to as mobile terminated (MT). In conventional manner, MO multimedia information is formatted into packets of data at the multimedia device 22. In one implementation, the packet-formatted data is converted, at the multimedia device, into a form more amenable to its transmission upon the reverse radio-link. The form will at times be referred to as radio-link format.

The mobile station 24 here forms a cellular radio telephone operable in a cellular communication system and is capable of transceiving signals on the forward and reverse link channels 16 and 18. The mobile station 24 is here shown to be coupled to the multimedia device 22 by way of lines 26. MO multimedia information is provided to the mobile station 24 therethrough. As noted above, in one implementation, the MO packet-formatted multimedia information is converted into a radio-link format at the multimedia device 22. In another implementation, such conversion is performed at the mobile station 24. MT multimedia information transmitted upon a forward link channel and received at the mobile station 24 is analogously also convertible out of a radio-link format and into packet-data format, either at the mobile station 24, or at the multimedia device 22, depending upon the manner in which the present invention is implemented.

The multimedia station 14 is here shown to be a fixed multimedia station, coupled to access network infrastructure 34 of a cellular communication system. Analogous to the multimedia station 12, the multimedia station 14 is operable to generate and receive the multimedia information formatted pursuant to a packet data format such as the RTP protocol. MT multimedia information is generated by 14 in packet data format. In one implementation, the access network infrastructure 34 is further operable to convert the packet-data formatted information into a radio-link format to facilitate efficient transmission of the MT multimedia information upon the forward radio-link to the multimedia station 12. MO multimedia information, received in radio link format, is converted by the access network infrastructure into packet data format.

The cellular system network infrastructure 34 is coupled to receive the multimedia information formed by the multimedia station 14 here by way of the lines 36. While not separately shown, the multimedia station 14 is coupled to the infrastructure 34 by way of an IP network. The infrastructure can also include elements based on GPRS (General Packet Radio Service). And, also while not separately shown, the infrastructure 34 includes, base station controllers, and base transceiver stations. The infrastructure 34 is operable to transceive signals on the forward and reverse channels, here represented by the arrows 16 and 18.

Associated with the user plane is the control plane. While the user plane relates to the packet data formatted multimedia information described above, the control plane relates to the protocols used for example to establish and tear down the multimedia call, as well as the logical channels carrying the individual media within the call. For example, the user plane of H.323 is based on RTP, while the control plane includes various application signaling protocols, especially H.245. The conversion to a radio-link format by 24 and 34 of the MO and MT real-time multimedia information respectively, is predicated on the knowledge that the media is real-time. The knowledge is acquired by a detection function which monitors the application signaling exchanged in the control plane. The detection function can be located in 24. Since 24 does not alter the application signaling exchanged between 22 and 14, the control plane protocols of 22 can be conventional in nature. Furthermore, because operation of an embodiment of the present invention converts packet data-formatted information into a radio-link format prior to its transmission and thereafter reconverts the information in the radio-link format back to a packet-data format, the multimedia device 22 can be of conventional construction in the user plane as well. That is to say, the multimedia device 22 can be of conventional construction to generate multimedia information pursuant to a standard multimedia protocol such as H.323. And, because of the conversion of the information into a radio-link format, the multimedia information can be transmitted in a spectrally efficient fashion upon a radio-link, such as that defined in a cellular communication system.

Figure 2:
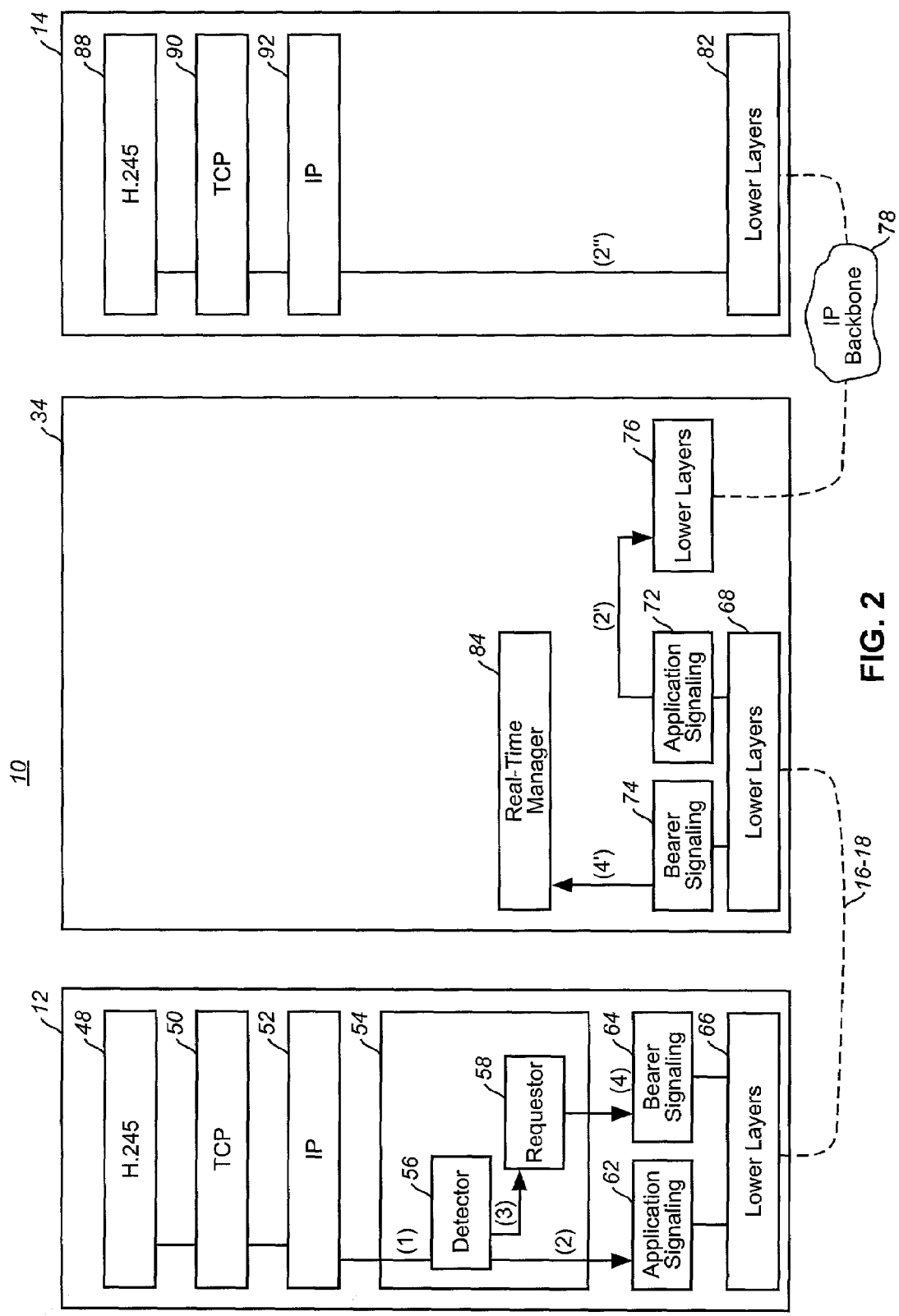
FIG. 2 illustrates a functional block diagram of the control plane of the radio communication system shown in FIG. 1 constructed according to an embodiment of the present invention.

FIG. 2 illustrates the logical layers of the control plane of the radio communication system 10 shown in FIG. 1 according to an embodiment of the present invention. The embodiment illustrated in FIG. 2 is that of a non-integrated configuration. That is to say, the embodiment shown in FIG. 2 is that of an implementation in which the upper logical layers of the control plane are conventional in nature, such as the upper level layers of a laptop computer, or the like, which is operable pursuant to a multimedia protocol using RTP, such as H.323, in conventional manner, without alteration. In the illustration of FIG. 2, the stations 12 and 14 and the access network infrastructure are pictured in terms of application layers. Operation of the embodiment of the present invention shown in the Figure adapts the multimedia protocol so that real-time media can be carried over a special air interface channel in a manner better to meet the delay and spectrum efficiency requirements of a radio communication system.

The forward and reverse channels 16 and 18 are commonly designated in the Figure. When the cellular communication system comprises a CDMA cellular communication system, such as that described in the IS-95 standard promulgated by the EIA/TIA, dedicated codes are used by which to encode the information prior to its transmission. And, in a TDMA cellular communication system, such as that defined in the IS-136 standard promulgated by the EIA/TIA, dedicated time slot-frequency combinations define the channels.

Here, the multimedia station 12 is shown to include an application signaling layer 48. The application signaling layer is defined pursuant to the multimedia protocol. For example, H.245 is the application signaling corresponding to the H.323 multimedia protocol. The layer 48 is operable, amongst other things, to request logical channels upon which to communicate different types of multimedia information. For instance, a request is made to open a logical channel to communicate voice data, or to communicate non-voice data, etc. Subsequent to communication of the data, a request is made to close the logical channel.

Signaling generated by the layer 48 is provided to a TCP layer 50 which is operable to form TCP data segments. The TCP layer runs on an IP layer 52 which is operable to format the data segments according to the IP protocols to add, e.g., headers and trailer thereto.

Formatted data generated by the layer 52 is detected by an adaptation layer 54. The adaptation layer 54 is here shown to perform, amongst other things, detection of the signaling generated by the upper layers. Here the function of the adaptation layer 54 to detect the data is represented by a detector 56. Responsive to detection of data generated by the layer 52, the adaptation layer 54 translates such signaling into a request to set up a special channel upon the radio-link extending between the stations 12 and the access network infrastructure. Such function performed by the adaptation layer 54 is represented in the Figure by a requester 58.

The access network infrastructure 34 is here shown also to include lower layers 68 which correspond to the lower application layers 66 of the multimedia station 12.

The access network infrastructure 34 further includes additional lower layers 76 to carry the application signaling. The lower layers 76 permits formation of a link by way of an IP backbone 78 with lower layers 82 of the station 14. The access network infrastructure is further shown to include a real-time manager 84.

Analogous to the layers 48, 50, and 52 of the station 12, the station 14 includes an application signaling layer 88, a TCP layer 90, and an IP layer 92. The application signaling layer 88 is defined pursuant to the multimedia protocol and is operable, amongst other things, to request logical channels upon which to communication different types of multimedia information. The TCP layer 90 is operable to form, and to receive, TCP data segments. And, the IP layer 92 is operable to format data segments, and to strip formatted data segments, in conventional manner. In such manner, both the stations 12 and 14 are formed of, in part, regular multimedia protocol over IP devices. That is to say, IP packet-formatted information, formatted pursuant to a multimedia protocol can be received, and generated thereat.

In exemplary operation in which the station 12 initiates communications, a request to set up a special channel is generated and provided, by way of the various layers 12, the radio links 16–18, the various layers of the access network infrastructure, and provided to and processed at the real-time manager 84 of the access network infrastructure. Setting up of the special channel includes setting up the channel on the radio link as well as converter functions (described below) in a user plane (also described below). After successful processing, a special channel is available to carry real-time media. The requester exchanges signaling with the real-time manager 84 over the paths labeled (4) and (4') in FIG. 2. In addition, H.245 (H.323 application signaling) exchanged between the station 12 and a remote end point, here the station 14, is relayed by the access network infrastructure over the paths labeled (2) and (2') in the Figure.

Figure 3:
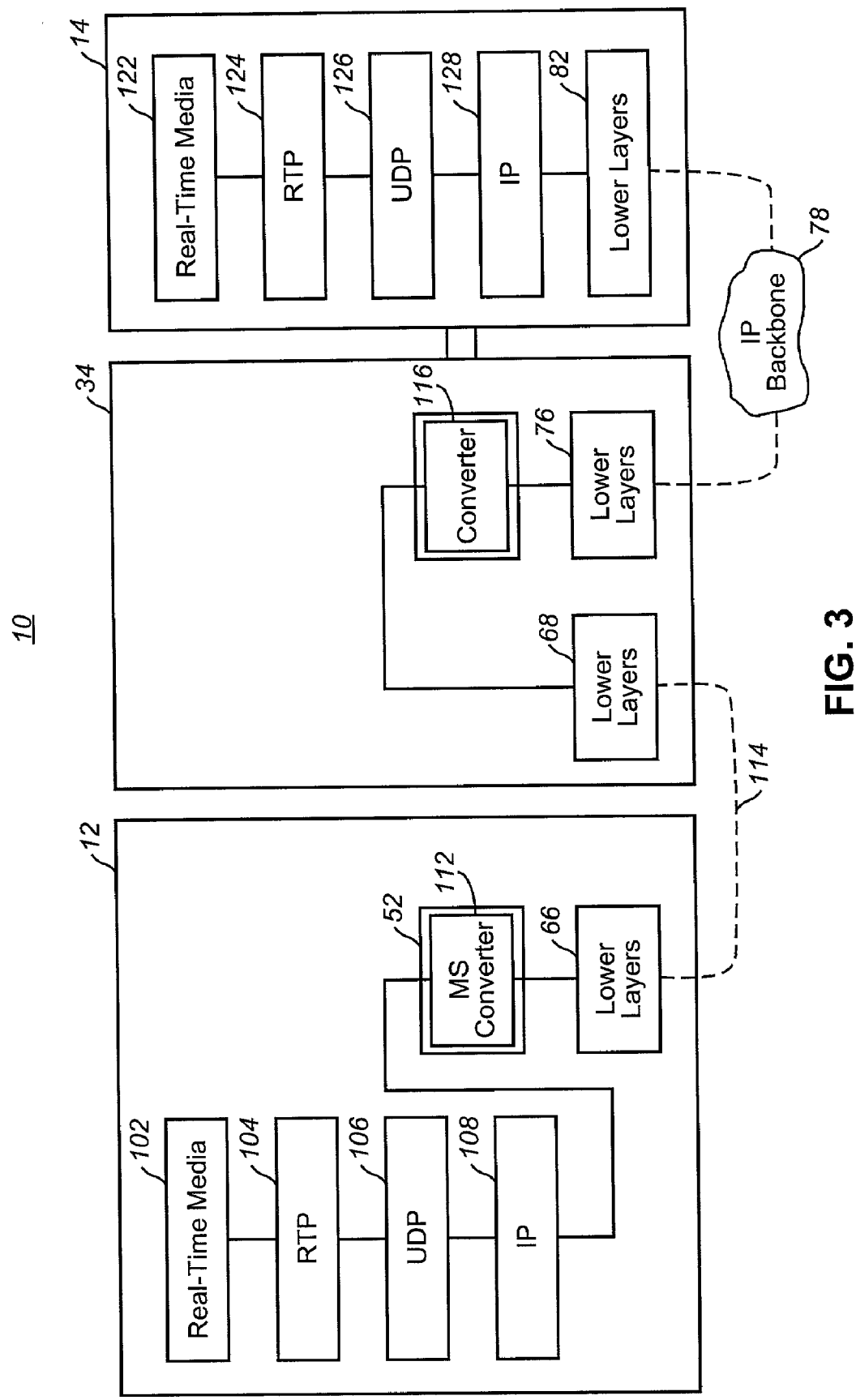
FIG. 3 illustrates a functional block diagram of the user plane of the radio communication system shown in FIG. 1 according to an embodiment of the present invention.

FIG. 3 again illustrates the radio communication system 10 shown in FIGS. 1–2, again showing multimedia stations 12 and 14 and access network infrastructure 34. FIG. 3 illustrates the user plane of a non-integrated configuration, analogous to the control plane layers of the non-integrated configuration shown in FIG. 2.

Here, the station 12 includes a real-time media layer 102 which runs on top of a RTP layer 104. The RTP layer is operable, amongst other things, to add a time stamp to data segments generated by the real-time media layer 102. The time stamp specifies the time when the associated real-time media sample was generated. The time stamp is used by the receiving end to correct any delay fluctuation introduced by the IP backbone network. The RTP layer also adds a sequence number to each packet. The sequence number is used by the receiving end to detect packet loss and/or missequencing and take the appropriate corrective action. The RTP header also includes other information, such as the Synchronization Source (SSRC). All packets coming from a SSRC are part of the same timing and sequence number space.

The RTP layer 104 runs on top of a UDP layer 106 which is operable to format data segments applied thereto. The UDP layer 106 runs upon an IP layer 108. The IP layer 108 corresponds to the IP layer 52 shown in FIG. 2. The IP layer runs upon the adaptation layer 54 which here is operable to perform converting functions, represented by the converter 112. Again, the adaptation layer runs upon lower layers, here again represented by lower layers 66.

A special channel 114 forms during operation of an embodiment of the present invention interconnects the station 12 with the access network infrastructure 34. As shown, the special channel interconnects the lower layers 66 of the station 12 with corresponding lower layers 68 of the access network infrastructure. The infrastructure 34 is here shown to include an access network infrastructure converter 116 which runs upon the lower layers 68. The converter 116 is also shown to run upon lower layers 76, which also were shown previously in FIG. 2. The lower layers 76 are connected by way of the IP backbone 78 with the corresponding lower layers 82 of the station 14.

The station 14 is here shown to include layers 122, 124, 126 and 128 which correspond with the corresponding layers 102, 104, 106, and 108, respectively, of the multimedia station 12.

During operation of the radio communication system, when in the user plane, packetized real-time media generated by the multimedia station 12 is processed by the converter 112. The converter 112 removes the RTP, UDP, and IP headers attached to the media generated by the medial 102 at the layers 104, 106, and 108, respectively. Once removed, the resultant media is provided to the lower layers 66.

The lower layers 66 are operable to perform conventional lower layer functions. For example, if real-time media is speech, lower layers may perform convolutional coding, interleaving, etc. They may also perform multiplexing with other types of traffic and media. As a result of processing by the converter, real-time media is transmitted in a spectrally efficient manner upon a radio link formed of the special channel 114. At the access network infrastructure, lower layers 68 perform the inverse operations. Thereafter, the converter 116 regenerates the RTP, UDP and IP headers. As the values of the UDP and IP fields do not change during a call, their values need only to be sent to the access network infrastructureat the special channel set up time and at time of handoff to another converter.

As the values of the RTP fields change, the ANI (Access Network Infrastructure) converter 116 must be able to derive the correct time stamps and sequence numbers of the RTP field. In one implementation, in which a circuit switched mode is used for the special channel, real-time media is received by the converter 116 in an extremely predictable manner. Therefore, the converter 116 is able to derive the running values of the RTP time stamp and sequence numbers merely by maintaining a local clock that increments monotonically and linearly in time.

For real-time media originating at the station 14, the converter 16 removes the RTP, UDP, and IP headers and generates a real-time media stream with the timing defined by the time stamps and sequence numbers received from the station 14. The result is transmitted upon the special channel 114. The converter 112 regenerates the RTP, UDP and IP headers based upon the same principle of a local clock.

Thereby, the mobile multimedia station 12, together with the ANI converter 116, appears to the multimedia station 14 merely to be another conventional multimedia station. In spite of such appearance to the multimedia station 14, operation of an embodiment of the present invention converts such packet data-formatted information into a radio-link format to facilitate its transmission in a spectrally efficient manner upon a radio-link. Once the radio-link-formatted information is received at the converter, the packet data-format of the information is regenerated.

FIG. 4 again illustrates the communication system 10, shown previously in FIG. 1, here again showing multimedia stations 12 and 14 and the access network infrastructure 34. Here, the logical layers of the control plane operation are illustrated in which the logical layers are formed in an integrated configuration according to an embodiment of the present invention. In this implementation, modifications are made to various of the logical layers to facilitate efficient communication of the multimedia between the stations 12 and 14.

In this implementation, the station 12 is shown to include an application signaling layer 148 which runs directly upon an adaptation layer 152 and also directly upon a TCP layer 154. Analogous to the adaptation layer 54 shown in the embodiment of FIGS. 2–3, the adaptation layer performs requesting functions, represented by the requester 156. The requester 156 performs functions analogous to the requester 58 shown in FIG. 2. In this implementation, the adaptation layer 152 need not perform detection functions.

The TCP layer 154 runs upon an IP layer 158.

The radio link formed of the radio channels 16 and 18 are again pictured as a single line 16–18 in the Figure. The access network infrastructure 34 is logically identical to that shown in the embodiment of FIG. 2. Here, the network infrastructure is shown to include lower layers 168, corresponding to the lower layers 68 shown in FIG. 2, and lower layers 176 corresponding to the lower layers 76 shown in FIG. 2. The lower layers 176 are coupled by way of an IP backbone 178 with lower layers 182 of the multimedia station 14. And, the network infrastructure 34 is again shown to include a real-time manager 184, corresponding to the real-time manager 84 shown in FIG. 2.

The multimedia station 14 is here shown include an application signaling layer 188 which runs upon a TCP layer 190 which, in turn, runs upon an IP layer 192. The layers 188, 190 and 192, form the functions of the layers 148, 154 and 158. respectively, of the multimedia station 12.

Figure 5:
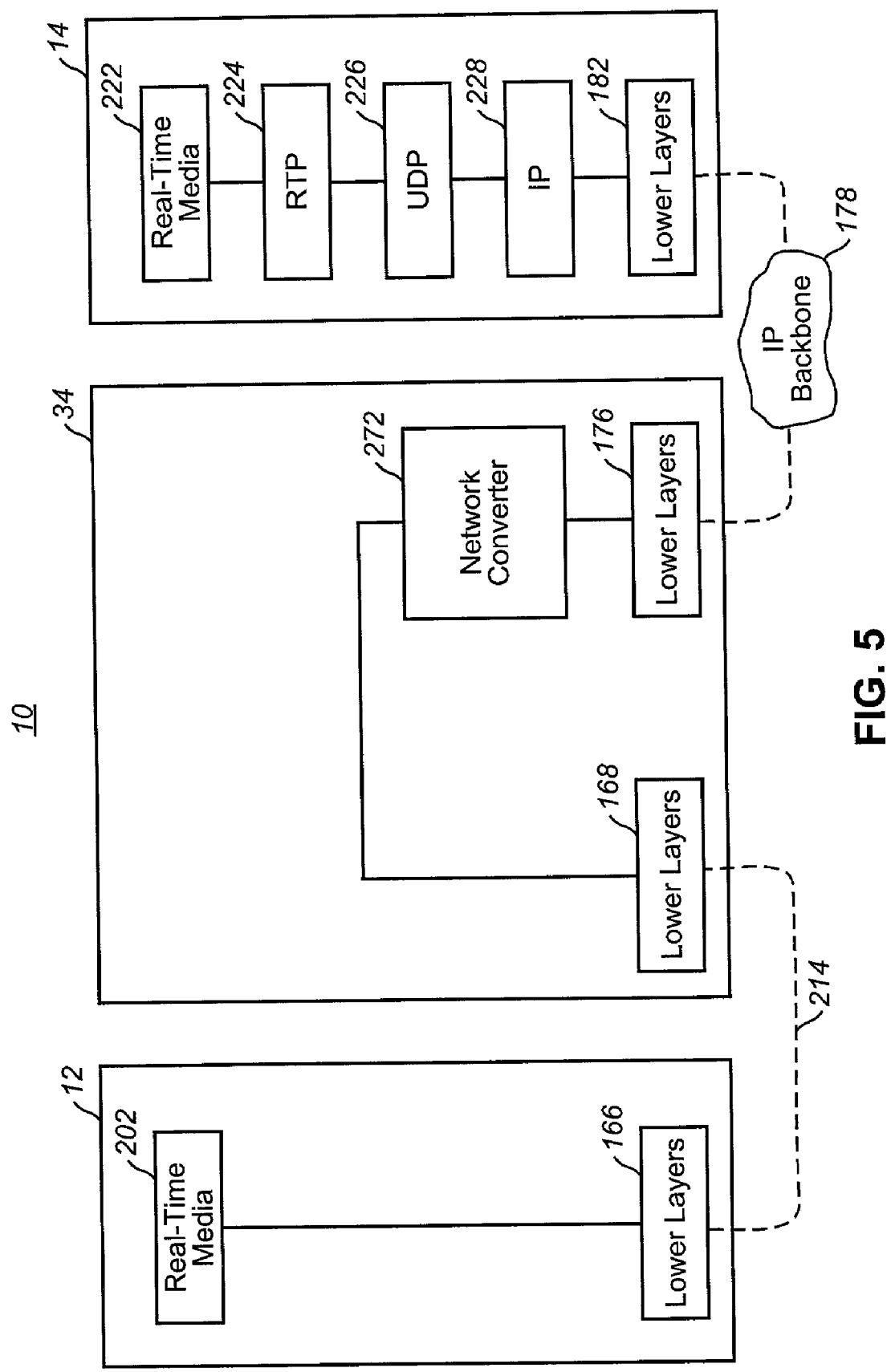
FIG. 5 illustrates a functional block diagram similar to that shown in FIG. 3, but according to another embodiment of the present invention.

FIG. 5 illustrates the user plane logical layers of the communication system 10 of the integrated configuration. Here, again, the communication system includes a multimedia station 12 and a multimedia station 14 together with an access network infrastructure 34. Once a call is established responsive to operation of the control plane functions, multimedia information is communicated between the multimedia stations 12 and 14 by way of the user plane.

The multimedia station 12 is here shown to include two logical layers, real-time media layer 202 and lower layers 166. A special channel 214 is formed to extend between the station 12 and the access network infrastructure 34. In the user plane, the access network infrastructure shown in FIG. 5 corresponds identically with the access network infrastructure logical layers shown in FIG. 3, here including lower layers 168 and access network infrastructure (ANI) converter 272, and lower layers 176.

The lower layers 176 are coupled by way of an IP backbone 178 with lower layers 182 of the multimedia station 14. The station 14 is further shown to include a real-time media layer 222, an RTP layer 224, a UDP layer 226, and an IP layer 228. Such layers correspond to the layers 122–128, respectively, of the multimedia station 14 shown in the embodiment of FIG. 3.

In the non-integrated configuration shown in the embodiments of FIGS. 2–3, a conventional multimedia protocol stack was included in the multimedia station. That is, the behavior of the multimedia protocol such as H.323, in the non-integrated configuration is not aware of the existence of an adaptation layer. The integrated configuration shown in the embodiment of FIGS. 4–5 permits improved optimization and streamlining by integrating the multimedia protocol stack with the adaptation layer. The stack is integrated with the adaptation layer in both the control plane and user plane of FIGS. 4 and 5, respectively.

Figure 4:
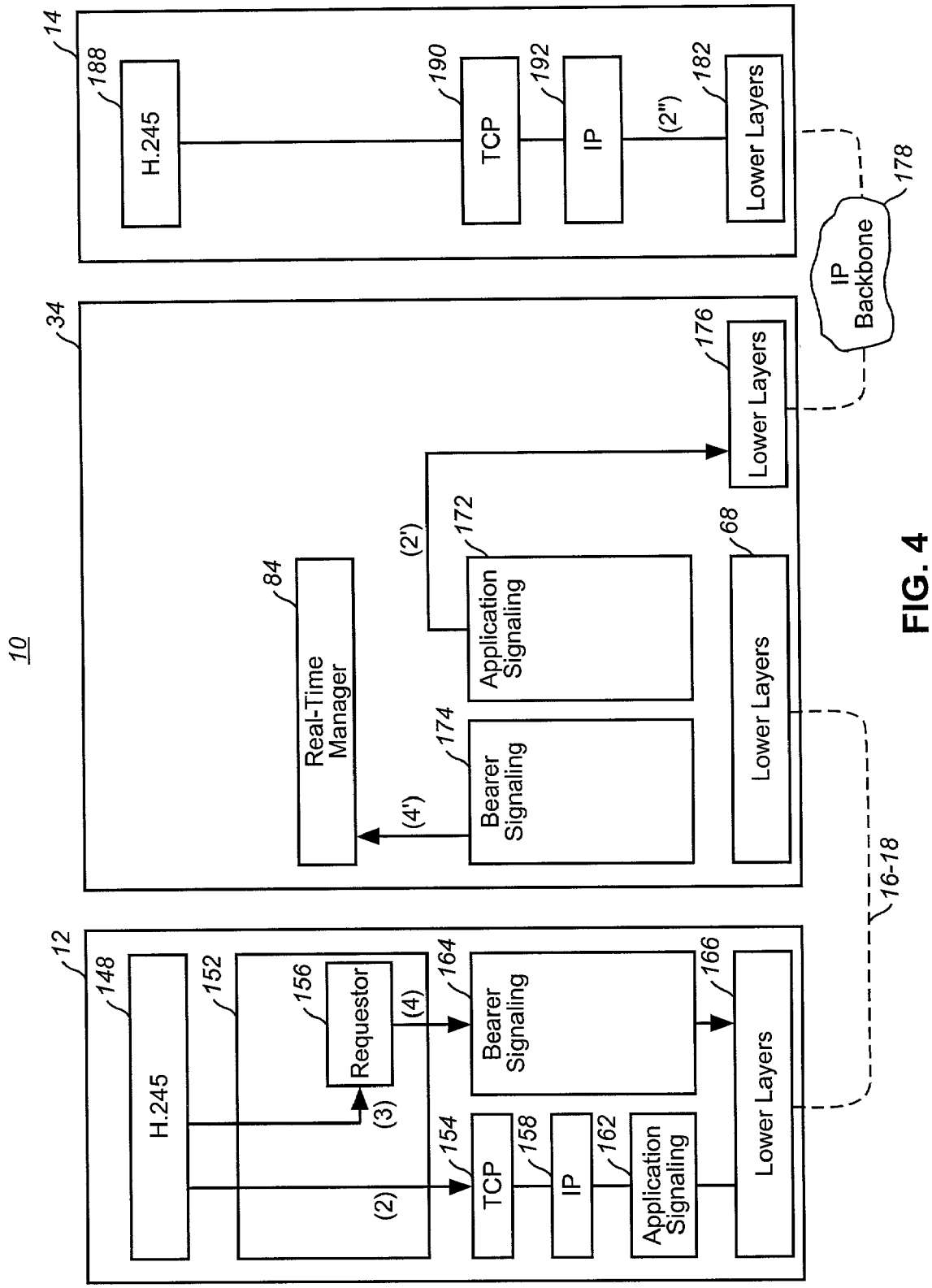
FIG. 4 illustrates a functional block diagram, similar to that shown in FIG. 2, but according to another embodiment of the present invention.

In the control plane shown in FIG. 4, the application signaling layer 148 makes a determination that a special channel is required for the communication of real-time media. Responsive to such determination, a request is forwarded to the requester 156 of the application layer 152. Thereby, need for a detector of the embodiment shown in FIG. 2 is obviated. Additionally, the adaptation layer 152 interfaces directly to the application, above the TCP and IP layers 154 and 158. In contrast, in the non-integrated configuration shown in FIG. 2, the TCP and IP layers are formed able the adaptation layer.

Also, in the user plane shown in FIG. 5, real-time media generated at the station 12 is sent directly to the special channel 214, thereby bypassing RTP, UDP and IP layers required in the non-integrated configuration shown in FIG. 3, also eliminating the requirement of a converter 112 of such non-integrated embodiment.

Figure 6:
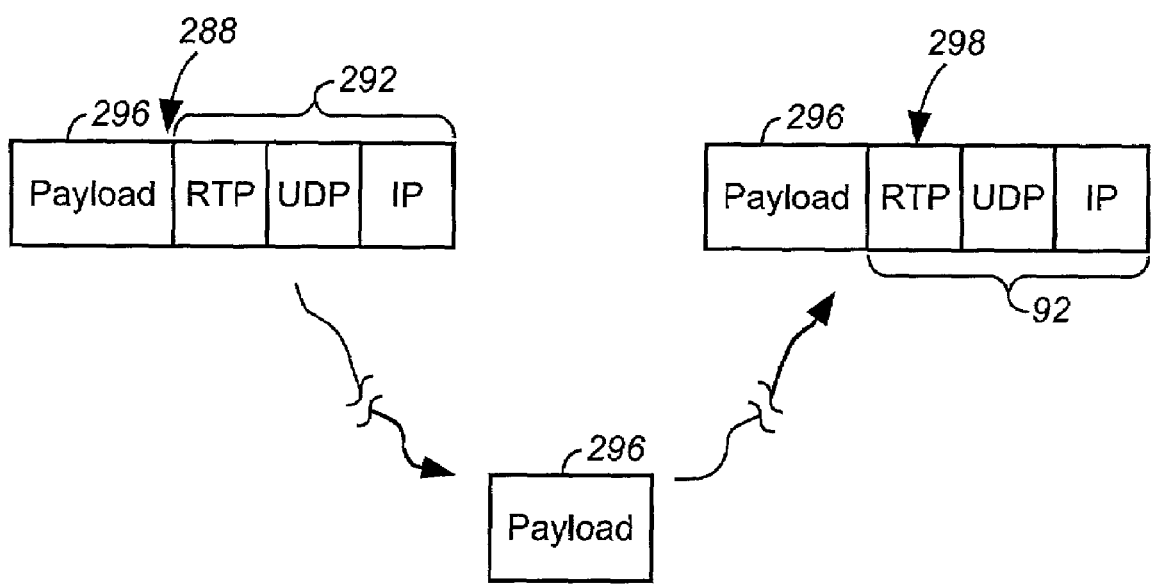
FIG. 6 illustrates the format of multimedia information generated during operation of an embodiment of the present invention.

FIG. 6 illustrates exemplary signal formats formed during operation of the multimedia stations 12 and 14 shown in the embodiments of FIGS. 2–3 and 4–5. An exemplary packet 288 of multimedia information is shown to be generated for transmission to the multimedia station 14. The packet is formed of a header portion 292 here including an IP section, a UDP section, and an RTP section. Appended to the header portion is a data payload 296, such as voice data.

During operation of the embodiment of the present invention shown in FIGS. 2–3, the adaptation layer 54 is operable, amongst other things, to convert the packet-formatted data, of which the packet 288 is exemplary, into a form amenable for transmission upon a special channel, that is, a circuit-switched channel or the like, of the radio communication system. Once converted, the data payload 296 is transmitted upon the special channel, as indicated in the center section of the Figure. Once received at the access network infrastructure 34, the data is reconverted into packet form as the packet 298. As illustrated, the packet 298 corresponds to the packet 288.

Figure 7:
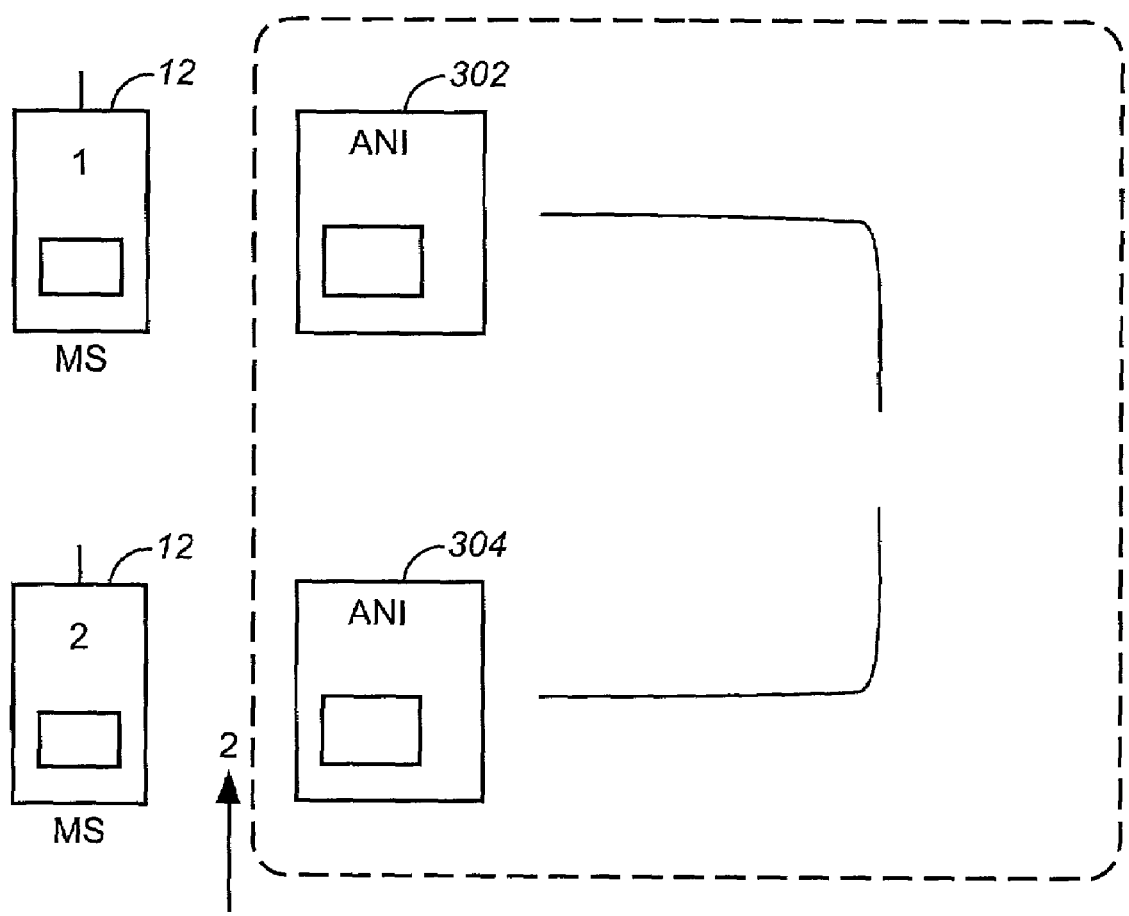
FIG. 7 illustrates a functional block diagram of a portion of a radio communication system, here to illustrate operation of an embodiment of the present invention during hand-off procedures.

FIG. 7 also represents the radio communication system 10 of the embodiment shown in FIGS. 2, 3, 4 and 5. Here, the network infrastructure is shown to include two access network infrastructures 302 and 304 positioned, for example, to be associated with separate, spaced-apart base stations of a cellular communication network. The Figure is illustrative of the ability, through operation of an embodiment of the present invention, to communicate multimedia information between two mobile multimedia stations 12.

The multimedia stations 12 are operable in control and user planes analogous to that described with respect to FIGS. 2, 3, 4 and 5 above. And, two access network infrastructures 34 are shown in the Figure, each operable relative to the stations 12 in manners described with respect to FIGS. 2, 3, 4 and 5 above. The separate access network infrastructures are coupled together by way of an IP backbone 78.

Figure 8:
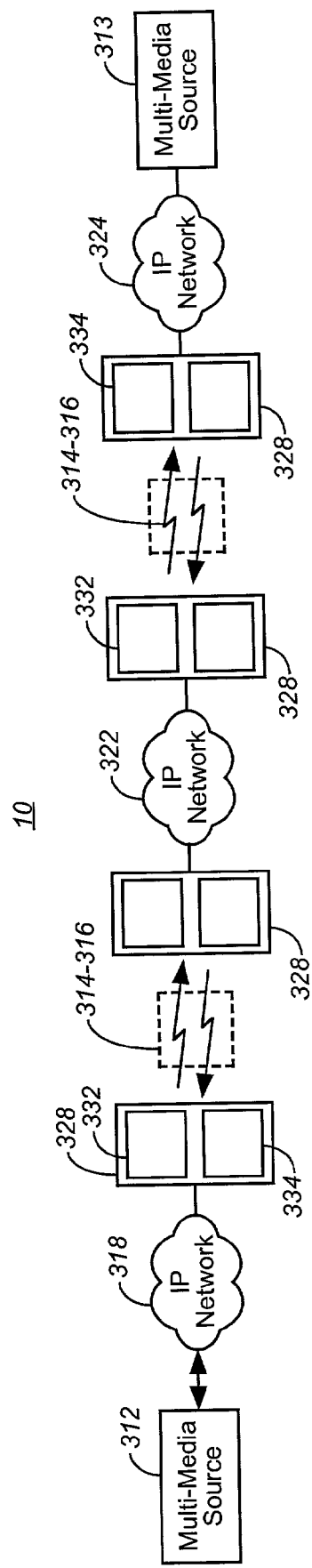
FIG. 8 illustrates a functional block diagram of a further embodiment of the present invention.

FIG. 8 illustrates a communication system 10 of a further embodiment of the present invention. In this implementation, multi-media information is communicated between two sources and sinks, here sources/sinks 312 and 313 of multi-media information. While, in the exemplary implementation, portions of the communication links formed between the sources/sinks 312 and 313 are formed of special channels formed of radio links 314–316, in other implementations, the communication link is formed in other manners, such as by way of wireline connections.

For purposes of defining operation of an embodiment of the present invention, the communication path formed between the sources/sinks of multi-media information 312 and 313 include IP networks 318, 322, and 324. In conventional manner, multimedia data is communicated through such IP networks by formatting the data in discrete packets, such as with the RTP, UDP, and IP headers and formatting information, as described above.

Communication system 10 is here shown to include a plurality of adaptors 328 which are operable to adapt the packet data, formatted in the formatted form into a spectrally-efficient form for communication upon the communication links 314–316 and to convert the media, once transmitted in the spectrally-efficient form into packetized form for communication over a respective IP network 318, 322, or 324.

The communication system 10 provides for 2-way communication of the multi-media information between the sources/sinks 312 and 313. Each of the adaptors 328, therefore, include an upstream adaptor portion 332 and a downstream adaptor portion 334. The upstream adaptor is defined as the device located on the same side of the radio link as the multimedia source, while the downstream adaptor is located on the same side of the radio link as the multimedia sink. The upstream adaptor portions of each of the adaptors are operable to detect when real-time multi-media is to be communicated upon a communication link and to request the allocation of a special channel upon the communication link to effectuate the communication of the real-time multi-media information thereto. Such operation is analogous to the operation of the adaptation layer 54 described previously with respect to operation of the embodiment shown in FIG. 2. And, the upstream adaptor portions 332 are further operable to convert the packet-formatted multi-media information into spectrally efficient form for transmission upon the special channel, once assigned. Such operation of the upstream adaptor is analogous to the operation of the adaptation layer 54 shown in the embodiment of FIG. 3. That is to say, the upstream adaptor removes the RTP, UDP and IP headers The downstream adaptor portions 334 of each of the adaptors 328 are operable to detect reception of the multi-media information transmitted in the spectrally-efficient form upon a special channel upon a communication link and to convert such communication into packet-data form, all as described with respect to the operation of portions of the access network infrastructure shown in FIGS. 2–3. The downstream adaptor is operable to regenerate IP, UDP and RTP headers. The values of the UDP and IP fields do not change during a call, so their values need to be sent by the upstream adaptor across the communications link (e.g., radio link) to the downstream adaptor only when the detector detects a real-time media logical channel setup. The downstream adaptor then memorizes these values. For the RTP field, the downstream adaptor must be able to derive the correct current time stamps and sequence numbers. If the special channel is such that real-time media is received by the downstream adaptor in a predictable manner, i.e., at a constant rate, the downstream adaptor is able to derive the running values of the RTP time stamp and sequence numbers just by maintaining a local clock that increments monotonically and linearly in time. The initial time stamp value and sampling rate can be sent by the upstream adaptor when the detector derives the values from monitoring the application signaling. If the sampling rate were to subsequently change, the upstream adaptor detects it from the application signaling and updates the downstream adaptor with the new sampling rate value.

In operation of the exemplary implementation shown in FIG. 8, multi-media information sourced at the multi-media information source 312 is formatted into packets of data thereat and then communicated upon the IP network 318 and delivered to the upstream adaptor portion 332 of the adaptor 328 connected to the IP network 318. The upstream adaptor portion 332 requests allocation of a special channel upon the communication link 314–316, and the portion 332 converts the packets of data into spectrally-efficient form for communication upon the special channel. A downstream adaptor portion 334 of the adaptor 329 coupled to the IP network 322 reformats the multimedia information received thereat to permit its communication through the IP network 322 to an upstream adaptor portion 332 of the adaptor 330 coupled to the IP network 322. Such upstream adaptor portion requests a special channel upon a subsequent communication link 314–316 and converts the packetized data into spectrally-efficient form for communication thereon. Adaptor 331 connected to the IP network 324 includes a downstream adaptor portion 334 operable to reconvert the information into packetized form for communication through the IP network 324, thereafter to be delivered at the multi-media source 313.

Multi-media information sourced at the source 313 is communicated to the multi-media source 312 in analogous but reverse manner. It should further he noted that any number of adaptor-communication link chains can be concatenated together as necessary to interconnect multi-media sending and receiving stations.

Figure 9:
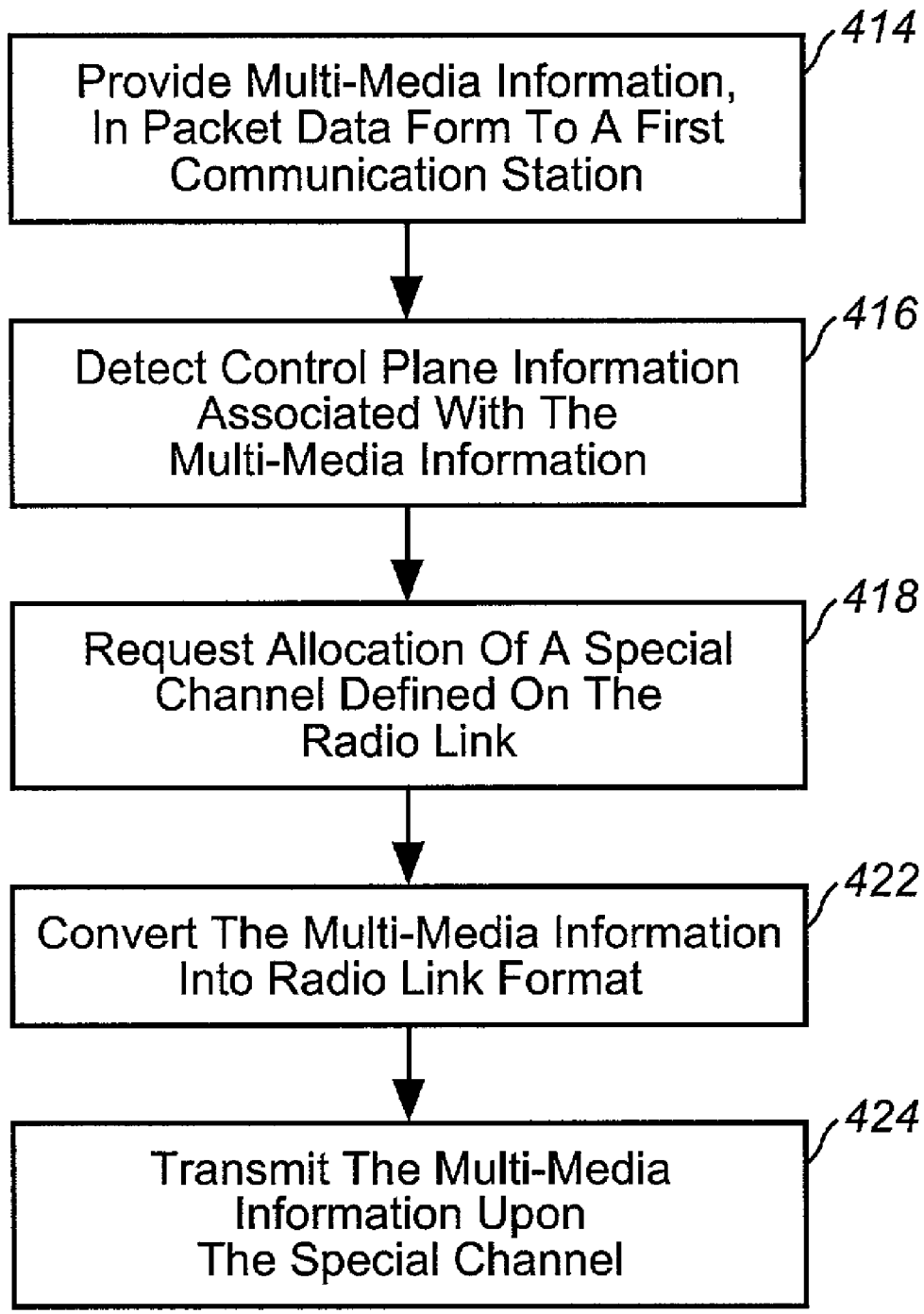
FIG. 9 illustrates a method flow diagram listing the method steps of the method of operation of an embodiment of the present invention.

FIG. 9 illustrates a method shown generally at 412, of an embodiment of the present invention. The method communicates multimedia information between a first communication station and a second communication station of a radio communication system. First, and as indicated by the block 414, the multimedia information is provided in packet-data form to the first communication station. Then, and as indicated by the block 416, control plane information associated with the multimedia information is detected.

Then, as indicated by the block 418, allocation of a special channel defined upon a radio-link between the first communication station and the second communication station is requested. Then, and as indicated by the block 422, the multimedia information is converted into a radio-link format, amenable for transmission upon the special channel. And, as indicated by the block 424, the multimedia information is transmitted upon the special channel to the second communication station. Thereby, through of operation of an embodiment of the present invention, a manner is provided by which to efficiently transmit multimedia information, generated pursuant to a multimedia protocol using RTP such as H.232 upon a radio-link, such as that formed in a cellular communication system. The multimedia information is converted into a form amenable for transmission upon the radio-link in a spectrally-efficient manner.

A fixed multimedia station sends and receives multimedia information in packet data format, in accordance with H.323 or another protocol with similar concepts of logical channels. An access network infrastructure is provided so that the mobile multimedia station can send and receive multimedia information in a format more adapted to the radio link. The access network infrastructure takes care of the necessary conversion so that seen from the entity corresponding with the mobile multimedia station, the mobile multimedia station plus access network infrastructure combination behaves like a fixed multimedia station. The various entities on the communication path are mobile multimedia station—cellular infrastructure which contains the access network infrastructure—IP network—fixed multimedia station. An embodiment of the present invention also applies to the case of mobile multimedia station to mobile multimedia station communication, in which case the entities on the path are: first mobile multimedia station—cellular infrastructure, which contains the access network infrastructure associated with the first station—IP network—cellular infrastructure which contains the access network infrastructure associated with the second station—second mobile multimedia station.

The previous descriptions are of preferred examples for implementing the invention, and the scope of the invention should not necessarily be limited by this description. The scope of the present invention is defined by the following claims:

We claim:

1. Apparatus for a radio communication system having a wireless gateway, the radio communication system operable to communicate multimedia information with a first multimedia device and a second multimedia device, for providing the multimedia information transmitted by the first multimedia device upon a special channel in radio-link format to the second multimedia device, said apparatus comprising:

a real-time media source at which the multimedia information is sourced;

a requester coupled to said real-time media source to receive indications of when the multimedia information is to be communicated by the first multimedia device, said requester for requesting allocation of the special channel upon which to communicate the real-time media;

a control plane information generator coupled to receive indications of the multimedia information, said control plane information generator for generating control plane information, the control plane information controlling a manner by which to provide the multimedia information, once converted into packet-data form, to the second multimedia device; and a format converter coupled to receive indications of the multimedia information in the radio-link format, said format converter for converting the multimedia information into the packet-data form, the multimedia information, once converted into the packet-data form provided to the second multimedia device in the manner determined by the control plane information.

2. The apparatus of claim 1 wherein said requester requests the allocation of the special channel with said control plane information generator.

3. The apparatus of claim 2 wherein said control plane information generator comprises a real-time manager, said real-time manager further for exchanging signaling with said requester pursuant to the requests for the allocation of the special channel.

4. The apparatus of claim 3 wherein the first multimedia device is defined in terms of logical layers, wherein said real-time media source is formed at a first logical layer and said requester is formed at a second logical layer, the first logical layer of a higher logical-layer level than the second logical layer.

5. The apparatus of claim 4 wherein the first logical layer comprises an application signaling layer.

6. The apparatus of claim 5 wherein the second logical layer comprises an adaptation layer.

7. The apparatus of claim 6 further comprising a third logical layer, the third logical layer of a lower logical-layer level than the second logical layer.

8. The apparatus of claim 7 wherein the third logical layer comprises a bearer signaling layer.

9. Apparatus for a radio communication system having a wireless gateway, the radio communication system operable to communicate multimedia information between a first multimedia device and a second multimedia device, for providing the multimedia information transmitted by the first multimedia device upon a special channel in radio-link format to the second multimedia device, said wireless gateway comprising:

a real-time media source at which the multimedia information is sourced;

a requester coupled to said real-time media source to receive indications of when the multimedia information is to be communicated by the first multimedia device, said requester for requesting with said control plane information generator allocation of the special channel upon which to communicate the real-time media;

a control plane information generator coupled to receive indications of the multimedia information, said control plane information generator for generating control plane information, the control plane information controlling a manner by which to provide the multimedia information, once converted into packet data form, to the second multimedia device; and a format converter coupled to receive indications of the multimedia information in the radio-link format, said format converter for converting the multimedia information into the packet-data form, the multimedia information, once converted into the packet-data form provided to the second multimedia device in the manner determined by the control plane information.

10. The wireless gateway of claim 9 wherein said control plane information generator comprises a real-time manager, said real-time manager further for exchanging signaling with said requester pursuant to the requests for the allocation of the special channel.

11. The wireless gateway of claim 10 wherein the first multimedia device is defined in terms of logical layers, wherein said real-time media source is formed at a first logical layer and said requester is formed at a second logical layer, the first logical layer of a higher logical-layer level than the second logical layer.

* * * * *